United States Patent
Zaman et al.

(10) Patent No.: US 8,488,874 B2
(45) Date of Patent: Jul. 16, 2013

(54) VARIABLE RATE SPRAYER SYSTEM AND METHOD OF VARIABLY APPLYING AGROCHEMICALS

(75) Inventors: Qamar-Uz Zaman, Truro (CA); Young Ki Chang, Truro (CA); Arnold W. Schumann, Lake Alfred, FL (US)

(73) Assignee: Dalhouse University, Halifax (CA)

( * ) Notice: Subject to any disclaimer, the term of this patent is extended or adjusted under 35 U.S.C. 154(b) by 209 days.

(21) Appl. No.: 13/017,800

(22) Filed: Jan. 31, 2011

(65) Prior Publication Data
US 2012/0195496 A1     Aug. 2, 2012

(51) Int. Cl.
*G06K 9/00*     (2006.01)
*G06K 9/34*     (2006.01)

(52) U.S. Cl.
USPC ............................................. 382/162

(58) Field of Classification Search
USPC .................. 382/110, 162, 170; 348/106, 144, 348/148, E07.085; 504/116.1, 367; 250/206.1; 47/57.6
See application file for complete search history.

(56) References Cited

U.S. PATENT DOCUMENTS

| | | | | |
|---|---|---|---|---|
| 5,604,534 | A * | 2/1997 | Hedges et al. | 348/144 |
| 7,099,004 | B2 | 8/2006 | Masten | |
| 2002/0023385 | A1 * | 2/2002 | Minato et al. | 47/1.01 R |
| 2002/0098984 | A1 * | 7/2002 | Fujita et al. | 504/367 |
| 2006/0252648 | A1 * | 11/2006 | Bell et al. | 504/359 |
| 2012/0195496 | A1 * | 8/2012 | Zaman et al. | 382/162 |

\* cited by examiner

*Primary Examiner* — Amir Alavi
(74) *Attorney, Agent, or Firm* — Maier & Maier PLLC (57) ABSTRACT

Systems, methods and computer-readable media are provided for controlling a variable-rate sprayer for precision agriculture. Highly efficient digital image processing enables rapid and reliable control of the variable rate sprayer. In one embodiment, image processing uses only a subset of luminance, hue, saturation and intensity textural features to provide rapid image recognition. In another embodiment, an image is decomposed into RGB components and a G is ratio determined. For example, the textural method is useful in growing season where color differentiation is difficult. The G ratio method is useful in early spring and late fall where color differentiation is possible. These rapid computationally light methods enable a mobile sprayer system to identify crop or field conditions in real-time and to dispense an appropriate amount of agrochemical in a specific section of the sprayer boom where the target has been detected as the mobile sprayer advances.

18 Claims, 4 Drawing Sheets

VARIABLE RATE SPRAYER SYSTEM AND METHOD OF VARIABLY APPLYING AGROCHEMICALS

CROSS-REFERENCE TO RELATED APPLICATIONS

This is the first application filed for the present invention.

TECHNICAL FIELD

The present technology relates generally to precision agriculture and, in particular, to variable rate sprayers.

BACKGROUND

Precision agriculture is a technique that detects specific attributes of a field and delivers precise amounts of agrochemicals based on these attributes. The field attributes may include the presence of bare spots, weeds, diseased crops, etc. The agrochemicals may include fertilizers, herbicide, insecticide, fungicide, etc. Using precision agriculture, a custom-tailored amount of agrochemical is delivered to each specific area of the field such as herbicide on weeds only, insecticide and fungicide on foliage, and fertilizer in plant areas only. Precision agriculture is a substantial improvement over traditional fanning techniques of evenly spraying the entire crop, irrespective of crop and field variations, which is almost invariably wasteful and expensive.

For example, in the specific case of wild blueberry fields, weeds are the major yield-limiting factor. Weed flora in blueberry fields traditionally consist of slow-spreading perennial species whereas many of the new species invading blueberry fields are common annual weeds of arable fields that produce large number of seeds and require control with herbicides both in prune and production year. Traditionally, herbicides are applied uniformly in wild blueberry fields, but weeds are not distributed uniformly within fields. Moreover wild blueberry fields have significant bare spots (30-50% of total field area). In these situations, spatial information management systems hold great potential for allowing producers to fine-tune the locations, timings, and rates of herbicide application.

Many researchers have attempted to develop variable rate (VR) technologies for various crops although to date little attention has been paid to wild blueberry production systems. Existing VR sprayers deliver pesticides based on prescription maps, developed in GIS software, using aerial spectral scans of wild blueberry fields. However, the GIS-based system was found to be too sensitive to positional error caused by Global Positioning System (GPS) and obtaining up-to-date aerial photography was expensive, the quality was quite variable, and data processing for weed detection was also intensive and difficult.

Ultrasonic sensors have been used for quantification of plant heights. Ultrasonic systems can detect weeds (when they are substantially taller or shorter than the plants) and bare spots in real-time within wild blueberry fields during growing season. Although the ultrasonic systems performed well to detect tall weeds (taller than plants) and bare spots in wild blueberry fields, one serious problem with this technique is that growers apply herbicides during the growing season when the grasses and weeds are not tall enough to sense using ultrasonic sensors, e.g. in April and October.

Spectroscopy techniques have also been explored as disclosed, for example, in U.S. Pat. No. 7,099,004 (Masten). The Masten technique involves collecting and wirelessly transmitting spectral information of a plant for remote analysis.

Machine vision techniques have also been employed for detecting weeds. However, these machine vision systems, based on morphological or textural weed detection methods, generally require a high image resolution and furthermore employ detection algorithms that are very complicated and computationally expensive. These existing machine vision techniques cannot be utilized practically in a mobile spraying system because the time between image capture and spraying is too short to enable the algorithm to identify the crop or field condition.

What is needed therefore is a very efficient machine vision algorithm that can identify the underlying crop or field condition so as to control the sprayer within the short amount of time between image capture and spraying while the mobile sprayer system advances at a normal ground speed.

SUMMARY

In general, the present invention provides systems, method and computer-readable media for variably spraying an agrochemical. The present invention uses computationally efficient techniques for detecting the crop or field condition based on digital imagery. Rather than relying on computationally expensive machine vision techniques, the present invention uses an innovative G ratio technique for image decomposed into RGB components or an innovative textural feature technique that uses only a subset of textural features drawn from luminance, hue, saturation and intensity co-occurrence matrices. As will be elaborated below, these algorithms enable rapid real-time detection of the crop conditions and/or soil or ground conditions so that the variable rate sprayer can dispense an appropriate amount of agrochemical with specific sections of the boom where the targets were detected while the mobile sprayer advances at a normal speed.

Thus, an aspect of the present invention is a mobile variable rate sprayer system for applying an agrochemical. The system includes a vehicle for transporting the agrochemical, at least one digital camera mounted to the vehicle for capturing an image, a processor for processing the image to determine textural image features using only a subset of luminance, hue, saturation and intensity image features, at least one controller for receiving signals from the processor, and at least one variable rate sprayer mounted on the vehicle, wherein each spray nozzle of the sprayer is controlled individually by the controller based on the image features.

Another aspect of the present invention is a method of variably applying an agrochemical. The method entails capturing an image, processing the image to determine image features by using only a subset of luminance, hue, saturation and intensity image features, and controlling a variable rate spray nozzle based on the image features to thereby deliver an appropriate amount of the agrochemical.

Yet another aspect of the present invention is a computer-readable medium comprising instructions in code which when executed by a processor of a computing device cause the computing device to send a signal to digital camera to cause the digital camera to capture an image, receive image data from the digital camera, process the image to determine image features by using only a subset of luminance, hue, saturation and intensity image features, and control an agricultural device based on the image textural features. For example, a variable rate spray nozzle may be controlled to deliver an appropriate amount of agrochemical.

Yet a further aspect of the present invention is a mobile variable rate sprayer system for applying an agrochemical. The system includes a vehicle for transporting the agrochemical, at least one digital camera mounted to the vehicle for capturing an image, a processor for processing the image into RGB components and to determine a G ratio by computing a ratio of G to the sum of R, G and B, at least one controller for receiving signals from the processor, and at least one variable rate sprayer mounted on the vehicle, wherein each spray nozzle of the sprayer is controlled individually by the controller based on the G ratio.

Yet a further aspect of the present invention is a method of variably applying an agrochemical. The method entails capturing an image, processing the image into RGB components and to determine a G ratio by computing a ratio of G to the sum of R, G and B, and controlling a variable rate spray nozzle based on the G ratio to thereby deliver an appropriate amount of the agrochemical.

Yet a further aspect of the present invention is a computer-readable medium comprising instructions in code which when executed by a processor of a computing device cause the computing device to send a signal to digital camera to cause the digital camera to capture an image, receive image data from the digital camera, process the image data into RGB components and to determine a G ratio by computing a ratio of G to the sum of R, G and B, control an agricultural device based on the G ratio, such as controlling a variable rate spray nozzle to deliver an appropriate amount of agrochemical.

The details and particulars of these aspects of the invention will now be described below, by way of example, with reference to the attached drawings.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

By way of general overview, the present invention provides mobile variable rate sprayer systems, methods of variable rate spraying and computer-readable media for identifying in real-time crop and field conditions and for dispensing agrochemicals based on these conditions using the variable rate sprayer(s) as the mobile sprayer advances at a normal speed.

VR Sprayer Systems

Figure 1:
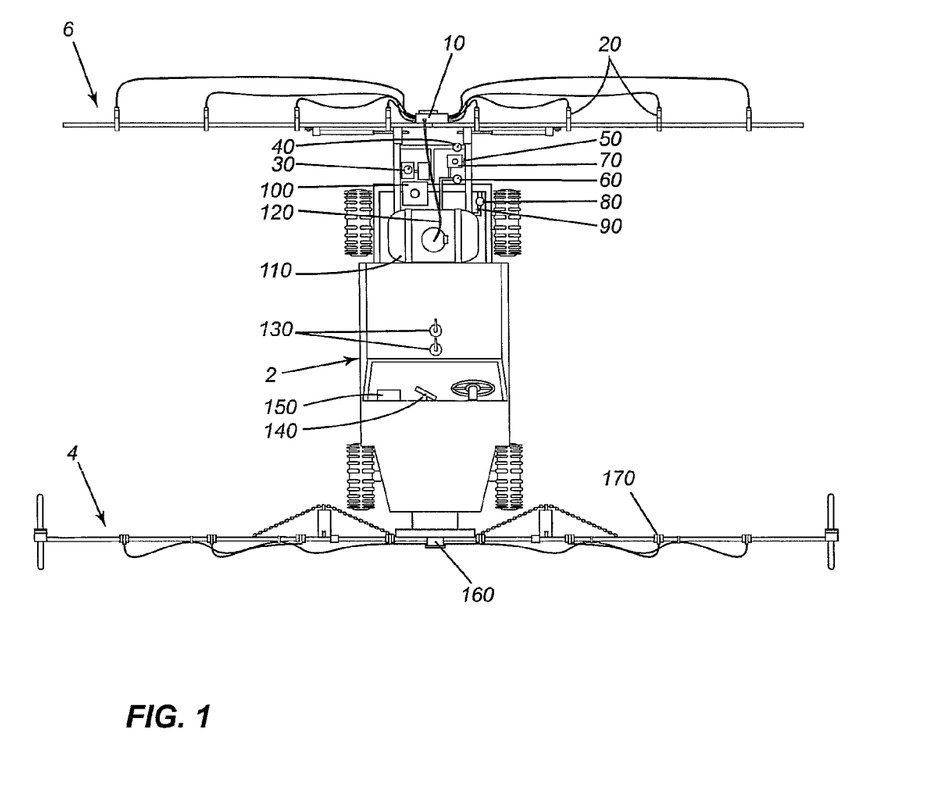
FIG. 1 is a top view of a mobile sprayer system in accordance with one embodiment of the present invention.
Figure 2:
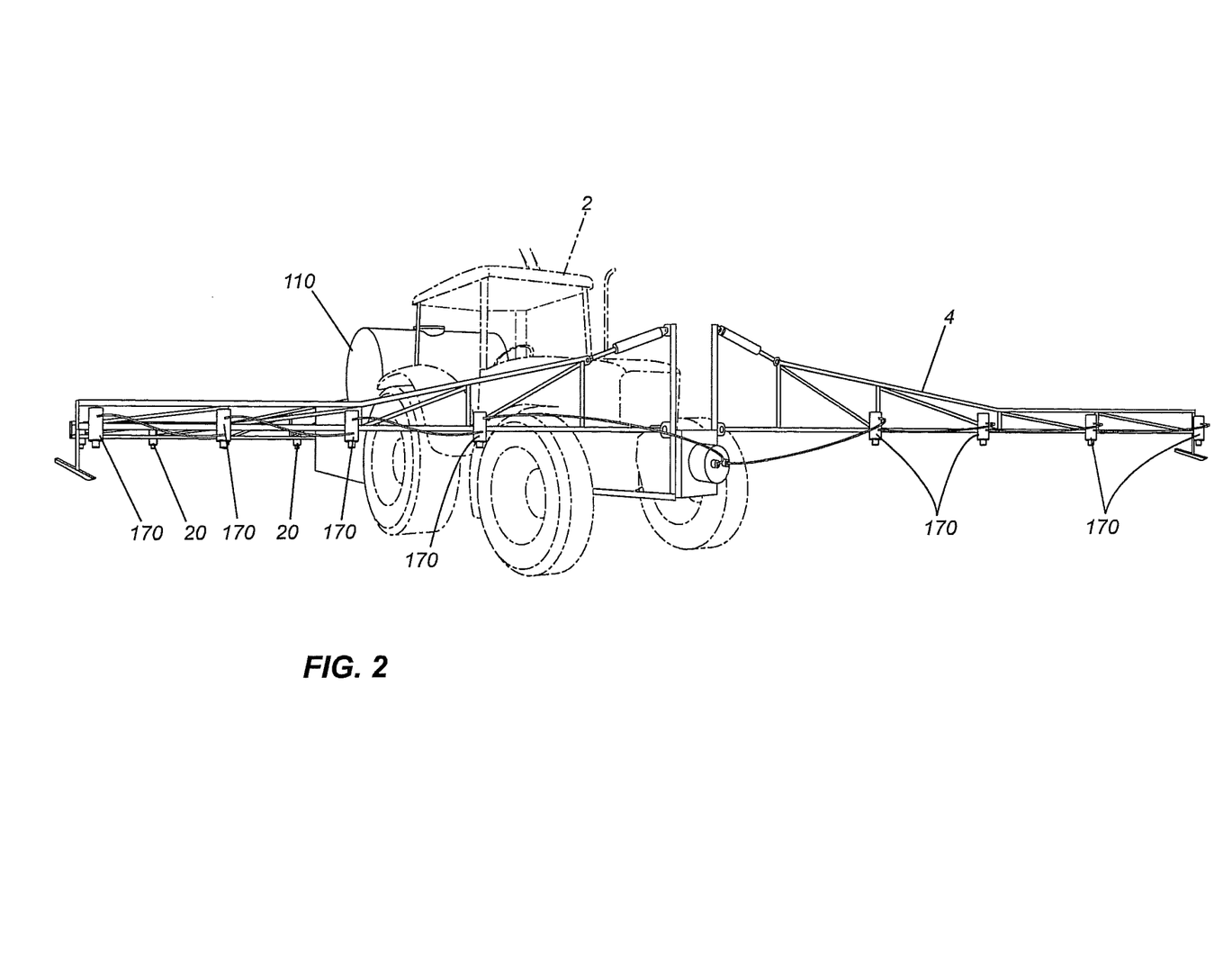
FIG. 2 is an isometric view of a tractor having booms supporting cameras and sprayers in accordance with another embodiment of the present invention.

FIG. 1 depicts a mobile variable rate sprayer system in accordance with one embodiment of the present invention. In general, the mobile variable rate sprayer system includes a vehicle 2 (for example, a tractor such as the one shown in FIG. 8, an all-terrain vehicle (ATV), truck, etc.) for transporting the agrochemical(s). In a variant, the vehicle may be any articulated vehicle having, for example, a trailer.

The mobile variable rate sprayer system includes at least one digital camera 170 mounted to the vehicle 2 for capturing digital images. In main embodiments, a plurality of spaced-apart digital cameras are mounted to, or otherwise supported along, a front boom 4, as shown by way of example in FIG. 1.

The mobile variable rate sprayer system includes a processor 150 (i.e. a microprocessor, computer, computing device, or other image-processing device) for processing the captured digital images taken by the cameras 170.

In one main set of embodiments, the processor determines image textural features using only a subset of luminance, hue, saturation and intensity image features, as will be elaborated below in greater detail.

In another main set of embodiments, the processor processes the image(s) into RGB components and determines a G ratio by computing a ratio of G to the sum of R, G and B, as will be elaborated below in greater detail.

Both of these algorithms are computationally efficient to enable rapid detection of crop and ground conditions so as to enable the variable rate sprayers to be controlled in real-time to dispense an appropriate amount of agrochemicals.

The agrochemicals may include fertilizers, pesticides, herbicides, fungicides. In one embodiment, the vehicle has a single container for a single type of agrochemical. In other embodiments, the vehicle has a plurality of containers for carrying different types of agrochemicals. It will thus be appreciated that this technology may be applied to a multi-function sprayer system that is capable of dispensing different types of agrochemicals as it passes over the field.

Referring again to FIG. 1, the mobile variable rate sprayer system includes at least one controller 140 for receiving signals from the image processor 150.

Still referring to FIG. 1, the mobile variable rate sprayer system includes at least one variable rate sprayer having a plurality of spray nozzles 20. In main embodiments, the system includes a rear boom 6 for supporting a plurality of spaced-apart spray nozzles 20. The spray nozzles of the sprayers are controlled by the VR controller based on either the image textural features or the G ratio, depending on which of the two algorithms is being employed at that time.

In main embodiments, the controller 140 is a multi-channel controller for controlling the plurality of VR spray nozzles 20. For example, a DICKEY-John Land Manager II controller may be employed. For example, in a specific implementation, an 8-channel controller is used to control eight VR spray nozzles 20. In this specific example embodiment, there are 4 cameras arranged along the front boom and 8 spray nozzles (forming the variable-rate sprayers) arranged along the rear boom. Image data from the 4 cameras is used to control each respective one of the 8 variable rate spray nozzles. Persons of ordinary skill will naturally appreciate that the number of cameras and the number of spray nozzles may be varied. Similarly, it will be understood that the ratio of cameras to sprayers need not be one-to-one. As depicted in FIG. 1, the cameras 170 may be connected to an electrical junction box 160. Alternatively, the cameras may be wirelessly connected.

FIG. 1 also shows some specific implementation details of this particular example mobile VR system. For example, the VR sprayer's boom may include solenoid valves linked to the spray nozzles. The VR sprayer's boom may support a common electrical junction box 10. A flow meter 30, pressure gauges 40, 60, and a control valve 50 may be provided, as shown, to monitor and control the flow of agrochemicals. The system may include a pump 70 driven by a pump motor 100, an optional filter 80, and an optional supply shutoff valve 90. Each type of agrochemical may be stored in its own storage tank 110. Multiple tanks may be provided.

FIG. 1 also shows that the vehicle may optionally have a GPS receiver for determining ground speed, for navigation purposes and also for mapping the fields and crops. When the device detects localized crop and ground conditions, this data may be stored to create a map of the crop or field. This mapping of the field can be used to facilitate a subsequent spraying of the field.

In one specific implementation, presented solely by way of example, image acquisition may be done with an off-the-shelf computer and connected digital cameras. For validation of the present technology, one implementation was done using image acquisition hardware (i.e. a processor) that consisted of 2.8 GHz Intel® Core™ i7 CPU and 4 GB RAM ruggedized personal computer, and 4 or 8 cameras (UI-1220SE/C, IDS Imaging Development System Inc., Woburn Mass., USA). Lenses (LM4NCL, Kowa Optimed Inc., Torrance, Calif., USA) had 3.5 mm focal length and were set up with fixed aperture (f/4.0) and infinity focuses. Two cameras were mounted in front of an all terrain vehicle (ATV) at a height of 1.22 m and the separation of cameras was 1.52 m (FIG. 1). Exposure time and digital gain were automatically controlled by auto exposure shutter/auto gain control (AES/AGC) to adjust for variable outdoor light conditions. Maximum auto exposure shutter was set to 2 ms to prevent picture blurring while the ATV or tractor was driving.

In one embodiment, the cameras may be μEye cameras instead of hyperspectral and/or multispectral cameras which are expensive and for which data processing is complicated.

Methods, Computer-Readable Media, Software, Algorithms

Figure 3:
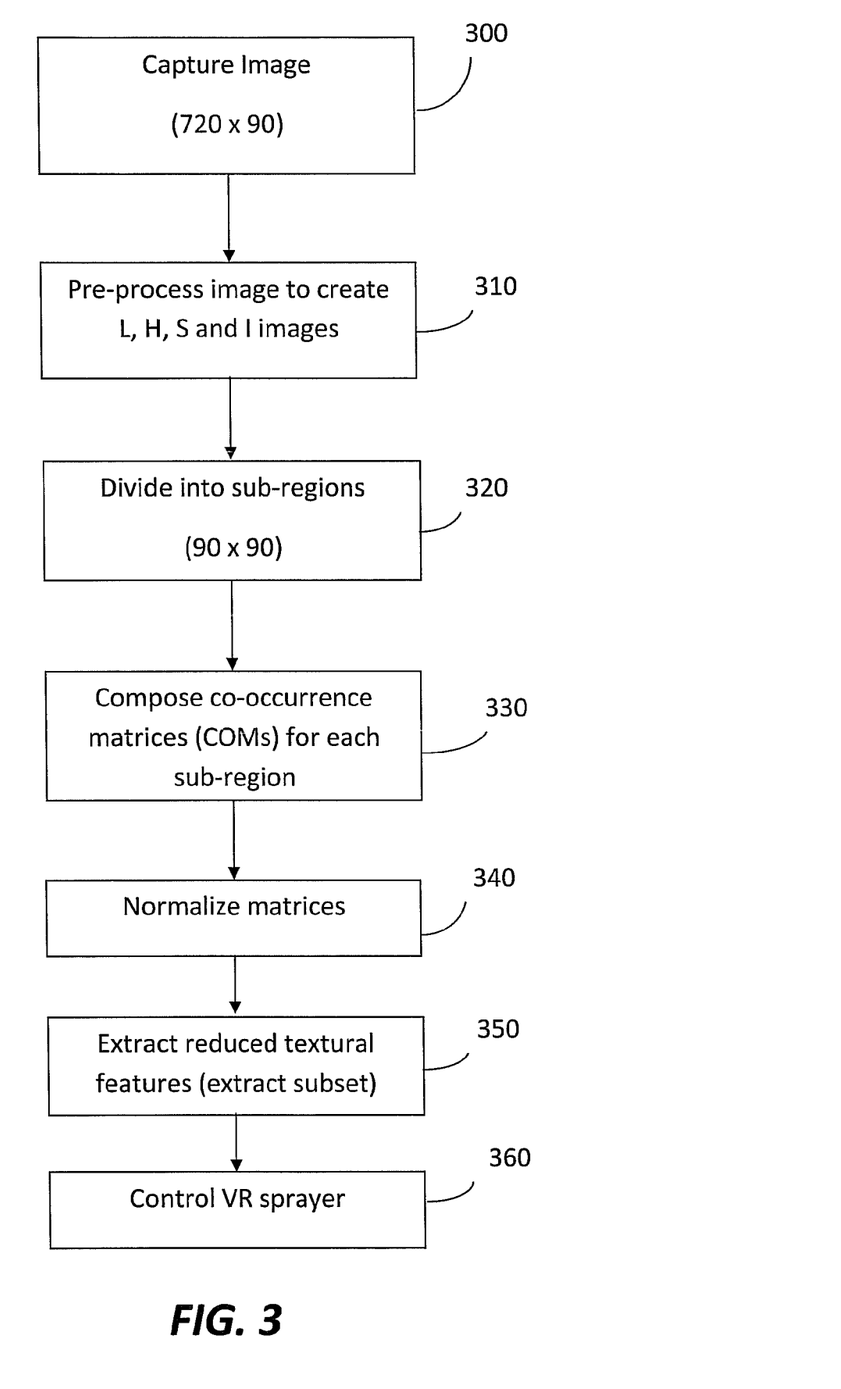
FIG. 3 is a flowchart presenting the general steps of processing an image to create co-occurrence matrices for L, H, S & I and for extracting a subset of the textural features from these matrices.

In accordance with another main aspect of the present invention, a method of variably applying an agrochemical, which is depicted in FIG. 3, entails capturing an image (i.e. a digital photograph) at step 300, processing the image to determine textural features by using only a subset of luminance, hue, saturation and intensity textural features, and controlling a variable rate spray nozzle based on the textural features to thereby deliver an appropriate amount of the agrochemical in a specific section of the sprayer boom where the target has been detected.

Processing the image may involve pre-processing the image (step 310) by converting the image into NTSC-standard luminance, hue, saturation and intensity images, dividing each image into sub-regions (step 320), composing co-occurrence matrices ("COMs") at step 330 for each of the sub-regions, and normalizing these matrices (step 340) to extract a subset of the total available textural features (step 350). In other words, instead of using all 44 available textural features, a subset of these features is used. This subset enables controlling of the VR spray nozzles at step 360.

In one embodiment, the subset comprises only eleven textural features drawn from hue, saturation and intensity co-occurrence matrices. In one specific implementation, which is presented by way of example, the textural features used are I2, H1, H9, I9, H7, I7, S2, S4, I8, I6, H11 (or, as another option I2, H1, H9, I9, H7, I7, I8, H11, I6) where I2 is intensity contrast, H1 is second angular moment of hue, H9 is difference entropy of hue, I9 is difference entropy of intensity, H7 is intensity entropy, I7 is intensity entropy, S2 is contrast of saturation, S4 is correlation of saturation, I8 is sum entropy of intensity, I6 is inverse difference moment of intensity, and H11 is a second information correlation for hue.

In another embodiment, the subset comprises only textural features drawn from saturation and intensity co-occurrence matrices. In one specific implementation, which is presented by way of example, the textural features used are I2, S2, S6, I9, S8, I11, S7, S9 where intensity contrast, S2 is saturation contrast, S6 is an inverse difference moment for saturation, I9 is difference entropy of intensity, S8 is sum entropy of saturation, I11 is a second information correlation for intensity, S7 is saturation entropy, and S9 is difference entropy of saturation.

In another embodiment, the subset comprises only textural features drawn from hue, saturation and intensity co-occurrence matrices. In one specific implementation, which is presented by way of example, the textural features used are H2, S1, S3, I3 where H2 means hue contrast, S1 is the angular second moment of the saturation, S3 is the sum of squares for saturation and I3 is the sum of squares for intensity.

The above method is thus a computationally efficient method of real-time agrochemical spraying that uses a reduced number of textural features. The reduced number of textural features (4, 8 or 11, depending on the specific algorithm) is much less than using all 44 textural features that can be computed using the eleven functions F1-F11 on the four L, H, S and I matrices. Efficient computation is achieved by using less than twelve of the forty-forty available textural features, which represents not more than 25% of the total number of available textural features.

This reduced textural feature algorithm is useful in the growing season when color differentiation is difficult. This reduced textural feature method, and the variants of the method disclosed herein, may be implemented in hardware, software, firmware or any combination thereof. As a software implementation, the method may be implemented as a computer-readable medium, computer program product or the like.

Figure 4:
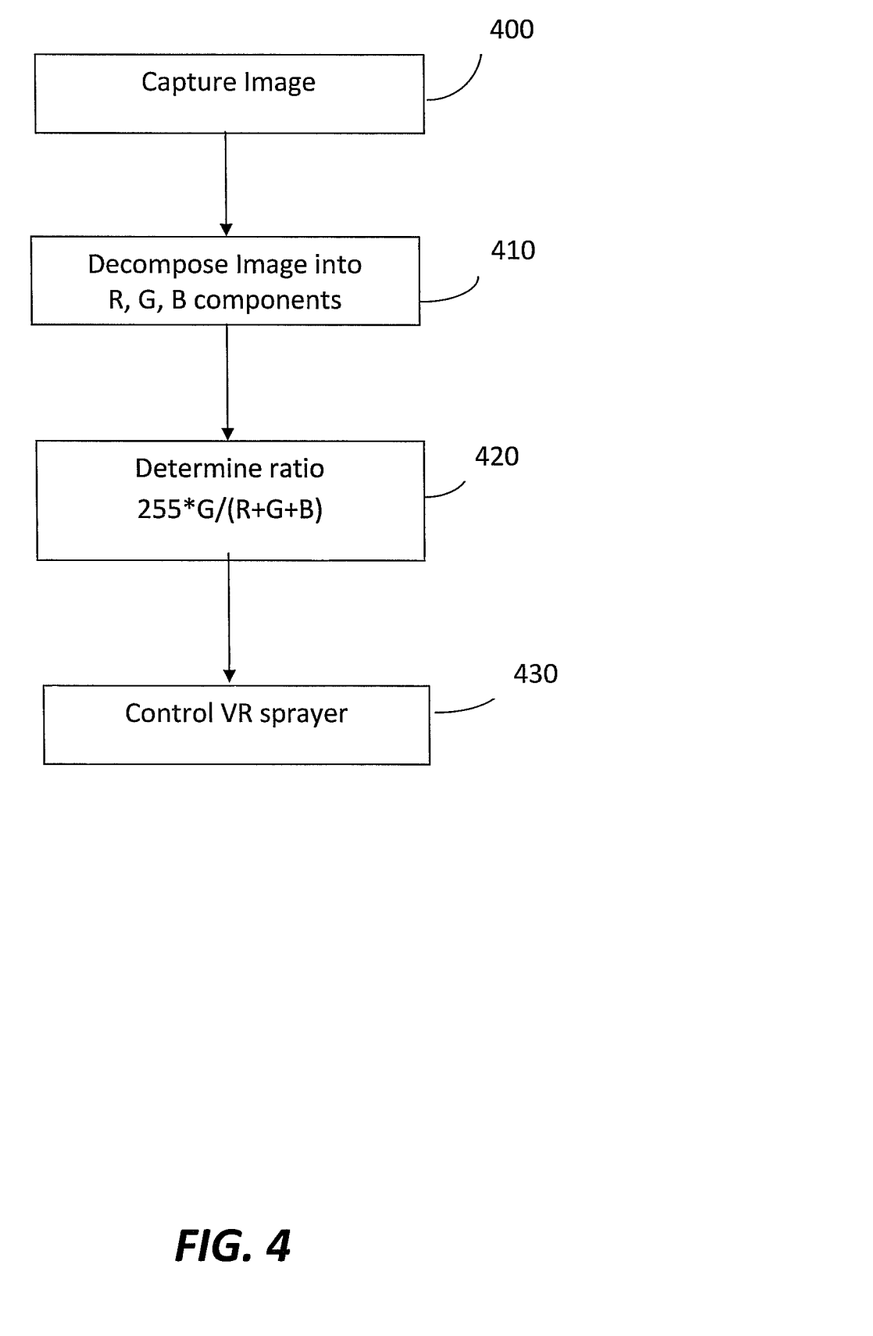
FIG. 4 is a flowchart presenting general step of a method of processing an image into RGB components for determining a G ratio.

Another method of variably applying an agrochemical, which is depicted in FIG. 4, entails capturing an image (step 400), processing the image into RGB (red, green, blue) components (step 410) and to determine a G ratio (green ratio) by computing a ratio of G (green) to the sum of R (red), G (green) and B (blue) and multiplied by, for example, a value of 255 at step 420. The method then involves controlling the variable rate spray nozzle(s) (step 430) based on the G ratio to thereby deliver an appropriate amount of the agrochemical. This G ratio technique is believed to be an improvement on the pre-existing RGB differences approach where differences such as (R−G) and (G−B) were calculated. Because of shade effects, the differences approach was found to be inaccurate. The innovative G ratio method disclosed herein provides a better overall result than the differences approach. This green color ratio algorithm is useful in early spring and fall when greenness enables differentiation of plants from bare soil.

This method may also be implemented in hardware, software, firmware of any combination thereof. As a software implementation, the method may be implemented as a computer-readable medium, computer program product, or the like.

It should be appreciated that the system may store software for both the colour ratio algorithm and the reduced textural feature algorithm so that the farmer can switch between these modes depending on the season, crop type or any other factor.

For example, this computer program product, computer readable medium or software may be written or coded in C++ using Microsoft® Visual Studio 2008 or any other object-oriented language. The software provides image acquisition and analysis. The custom-developed program is designed to acquire 24-bit RGB 720×90 images corresponding to a 1.52 m×0.19 m area of interest from each camera and to save this in a BMP file format as an option.

For validation, two wild blueberry fields were selected in central Nova Scotia to collect sample images of BS, WBB and weeds. Both fields were in their vegetative sprout year of the biennial crop production cycle. Images were taken with sunny condition and with cloudy condition from field 1 and field 2, respectively. Training and validation sets of images were formed with randomly selected images from two different fields. Total number of images was 1018 and equally divided to each set.

For image processing, Matlab® Image Processing Toolbox Version 7.8.0 (MathWorks, Natick, Mass., USA) was used for image pre-processing, the construction of COMs, extraction of textural features and the optionally saving of the textural features as a text file.

Image pre-processing may include the conversion from BMP images to 6-bit (64-level) intensity images of the National Television System Committee (NTSC) standard for luminance and HSI. The NTSC standard for luminance (Eq. 1) was used, instead of a simple arithmetic mean of RGB values, to reduce variations caused by ambient light.

$$L = (0.2989 \times R + 0.5870 \times G + 0.1140 \times B)/4 \quad (1)$$

Each of the pre-processed 720×90 images was divided into eight 90×90 sub-regions, for each of which COMs were constructed and texture features derived. The 90×90 sub-region is a classification unit which can be classified as WBB, BS and weeds.

COM was calculated by comparing a pixel's intensity level to another pixel's with a given offset (d) and relative orientation angle in the image (θ). COM can be represented by a marginal probability function P(i,j,d,θ), where i is the intensity level at a certain pixel, and j is the intensity level of another pixel with an offset of d and orientation angle θ. An orientation angle of 0° was selected for this study. Four COMs were made from 64 level L, H, S and I images. These matrices were then normalized by applying equation (2).

$$p(i, j) = \frac{P(i, j, 1, 0)}{\sum_{i=0}^{N-1} \sum_{j=0}^{N-1} P(i, j)} \quad (2)$$

The set of textural features (equations given in Table 1) was based on the textural features used by Shearer and Holmes (1990). Eleven features were extracted from each of the L, H, S and I matrices. As a result, a total of 44 textural features were extracted from every 90×90 pixel sub-region of acquired image. These features were numbered serially, prefixed with one of "L", "H", "S" or "I" and subscripted sequentially (1 to 11). In the notation, prefixes L, H, S and I represent luminance, hue, saturation, and intensity, respectively.

TABLE 1

The equations of textural features.

| Textural feature | Description | Equation |
|---|---|---|
| F1 | Angular second moment | $\sum_{i=0}^{N-1}\sum_{j=0}^{N-1} p(i,j)^2$ |
| F2 | Contrast | $\sum_{|i-j|=0}^{N-1} (i-j)^2 \sum_{i=0}^{N-1}\sum_{j=0}^{N-1} p(i,j)$ |
| F3 | Sum of squares | $\sum_{i=0}^{N-1} (i-\mu)^2 p_x(i)$ |
| F4 | Correlation | $\dfrac{\sum_{i=0}^{N-1}\sum_{j=0}^{N-1} i \cdot j \cdot p(i,j) - \mu^2}{F3}$ |
| F5 | Product moment | $\sum_{i=0}^{N-1}\sum_{j=0}^{N-1} (i-\mu)(j-\mu)p(i,j)$ |
| F6 | Inverse difference moment | $\sum_{i=0}^{N-1}\sum_{j=0}^{N-1} \dfrac{p(i,j)}{1+(i-j)^2}$ |
| F7 | Entropy | $\sum_{i=0}^{N-1}\sum_{j=0}^{N-1} p(i,j) \ln p(i,j)$ |
| F8 | Sum entropy | $\sum_{k=0}^{2N-2} p_{x+y}(k) \ln p_{x+y}(k)$ |
| F9 | Difference entropy | $\sum_{k=0}^{N-1} p_{x-y}(k) \ln p_{x-y}(k)$ |
| F10 | Information correlation1 | $\dfrac{F_7 - HXY1}{HX}$ |
| F11 | Information correlation2 | $[1 - e^{-2(HXY2-F7)}]^{1/2}$ |

$$HX = \sum_{i=0}^{N-1}\sum_{j=0}^{N-1} p_x(i) \ln p_x(i)$$

$$HXY1 = -\sum_{i=0}^{N-1}\sum_{j=0}^{N-1} p(i,j) \ln[p_x(i)p_x(j)]$$

$$HXY2 = -\sum_{i=0}^{N-1}\sum_{j=0}^{N-1} p_x(i)p_x(j) \ln[p_x(i)p_x(j)]$$

μ is the mean intensity level in a particular sub-region; and p(i, j) is the (i, j)$^{th}$ entry in a normalized COM. $p_x(i)$ and $p_y(j)$ were obtained by summation of COM values along the i$^{th}$ row and the j$^{th}$ column of p(i, j), respectively.
$p_{x+y}(k)$ and $p_{x-y}(k)$ were calculated using are given as:

$$p_{x+y}(k) = \sum_{i=0}^{N-1}\sum_{j=0}^{N-1} p(i,j); \ i+j = k, \ k = 0, 1, \ldots, 2N-2$$

$$p_{x-y}(k) = \sum_{i=0}^{N-1}\sum_{j=0}^{N-1} p(i,j); \ i-j = k; \ k = 0, 1, \ldots, N-1$$

Reduction of features and multiple discriminant analysis. A total of eleven models were chosen including ten discriminant function (DF) models which start with DF, and $HSI_{LD}$ model which will be described below (Table 2).

TABLE 2

Classification models, COM sets and selected textural features

| Model | Used COM set(s) | Selected textural features |
|---|---|---|
| DF_ALL | L, H, S and I | All 44 |
| DF_HSI | H, S and I | H1~H11, S1~S11 and I1~I11 |

TABLE 2-continued

Classification models, COM sets and selected textural features

| Model | Used COM set(s) | Selected textural features |
|---|---|---|
| DF_L | L | L1~L11 |
| DF_H | H | H1~H11 |
| DF_S | S | S1~S11 |
| DF_I | I | I1~I11 |
| DF_HSI$_{SD}$ | H, S and I | I2, H1, H9, I9, H7, I7, S2, S4, I8, I6, H11 |
| DF_HS$_{SD}$ | H and S | S2, H1, H9, H7, S10, S6, S8 |
| DF_HI$_{SD}$ | H and I | I2, HI, H9, I9, H7, I7, I8, H11, I6 |
| DF_SI$_{SD}$ | S and I | I2, S2, S6, I9, S8, I11, S7, S9 |
| HSI$_{LD}$ | H, S and I | H2, S1, S3, I3 |

The "DF_ALL" model which was used as a control model containing all 44 features. The features of five models (DF_HSI, DFL, DF_H, DFS and DF_I) were reduced by removing COM set(s). Another four models (DF_HSI$_{SD}$, DF_HS$_{SD}$, DF_HI$_{SD}$ and DF_SI$_{SD}$) were reduced by removing COM set(s) and feature reduction. Feature reduction was accomplished by SAS PROC STEPDISC procedure with 0.0015 for SLE (significant level for entry) and 0.001 for SLS (significant level for stay). SAS PROC DISCRIM procedures with reduced features were performed to derive each DF model's constants and weights of variables of multiple discriminant functions for the calculation of classification scores in the next step.

In an effort to develop a model with low computational overhead, a set of charts were prepared by plotting the HSI features against one another and the most effective two plots selected in terms of their selecting ability by linear discriminant (HSI$_{LD}$ model). Visual inspected training set images were used for feature reductions including HSI$_{LD}$ model and deriving of multiple discriminant function sets.

Classification Accuracy

Extracted features of validation images which were visual inspected were imported to Microsoft® Excel program and calculated with each models' constant and variables or compared with discriminant lines. The total number of observation was 4072 (i.e. 8 sub-regions×509 images)

The calculation steps of the discriminant function algorithms were: (1) calculate classification scores for each case for each category, by applying the equation (3), (2) decide category by selecting biggest case's score out of three classification scores. $S_i = c_i + w_{i\_1} \times x_1 + w_{i\_2} \times x_2 + \ldots + w_{i\_m} \times x_m$ (3), where $S_i$ is the classification score; the subscript i denotes the category; the subscripts 1, 2, ..., m denote the m variables; $c_i$ is a constant for the ith category, $w_{i\_j}$ is the weight for the jth variable in the computation of the classification score for the ith category; $x_j$ is the observed value for the jth variable.

The steps of HSI$_{LD}$ model algorithm included: (1) determine a sample's category as BS using the calculation (H2<−16.8/27.2×S3+16.8) with discriminant line, S3 and H2 value, (2) determine another sample's category as weed/or WBB using the calculation (WBB: S1<−0.0098/96×I3+0.0098) with another discriminant line, I3 and S1.

Reduction of Features and Multiple Discriminant Analysis

The processing time of DF_ALL model was measured with C++ computation and the ruggedized laptop (2.5 GHz Intel® Core™2 Duo CPU). It took 83 ms to compose 4 COMs and extract 44 features of one 720×90 image. Eight cameras would be required for a 12.2 m commercial wild blueberry sprayer boom (camera coverage of 1.55 m×8). The processing time of eight images will be increased for commercial application. It is imperative to reduce the processing time by removing the COM set(s) and/or statistical feature reduction methods.

Reduction results of tested models with training set are shown in Table 2. The DF_HSI$_{SD}$ model enabled the reduction of required features from 33 (H, S and I) to 11 using three COMs. The DF_HS$_{SD}$, DF_HI$_{SD}$ and DF_SI$_{SD}$ models enabled reduction from 22 to 7, 9 and 8 features, respectively. The result of discriminant analysis of DF_SISD model can be shown (Table 3), instead of ten DF models' results.

TABLE 3

Variables of discriminant function of SI model.

| Variables | Category | BS | WBB | Weeds |
|---|---|---|---|---|
| Constant ($c_i$) | | −9720 | −9716 | −9896 |
| Weight of variables | $w_{i\_I2}$ | −2.40214 | −3.48922 | −3.29153 |
| | $w_{i\_S2}$ | −8.23015 | −7.48702 | −8.13761 |
| | $w_{i\_S6}$ | 17288 | 17331 | 17469 |
| | $w_{i\_I9}$ | 48.94084 | 72.25432 | 65.40650 |
| | $w_{i\_S8}$ | −8190 | −8103 | −8229 |
| | $w_{i\_I11}$ | 5210 | 5095 | 5194 |
| | $w_{i\_S7}$ | 8590 | 8527 | 8648 |
| | $w_{i\_S9}$ | −4293 | −4252 | −4323 |

The HSI$_{LD}$ model, that uses linear discrimination with two scatter plots, could reduce features down to 4 from an initial set of 33 features of DF_HSI model.

Classification Accuracies

Classification accuracies are listed in Table 4 on the basis of BS, WBB and weeds identification.

TABLE 4

Accuracies of classification models.

| | Accuracy (%) | | |
|---|---|---|---|
| Model | BS | WBB | weeds |
| DF_ALL | 100.0 | 98.9 | 93.9 |
| DF_HSI | 100.0 | 98.2 | 93.5 |
| DF_L | 89.7 | 69.3 | 73.8 |
| DF_H | 99.2 | 92.8 | 75.7 |
| DF_S | 86.5 | 92.0 | 86.9 |
| DF_I | 89.7 | 69.9 | 73.8 |
| DF_HSI$_{SD}$ | 99.1 | 96.1 | 86.9 |
| DF_HS$_{SD}$ | 100.0 | 89.5 | 86.0 |
| DF_HI$_{SD}$ | 99.2 | 94.9 | 81.3 |
| DF_SI$_{SD}$ | 97.7 | 93.1 | 86.0 |
| HSI$_{LD}$ | 95.3 | 92.1 | 85.0 |

The DF_ALL model produced the best accuracies among the eleven models. It showed 100.0, 98.9 and 93.9% of accuracies for BS, WBB and weeds, respectively. Every reduced set model by removing COM set(s) models (DF_HSI and four individual COM models) showed lesser accuracy than the DF_ALL model.

The accuracies of the DF_HSI model were 100.0, 98.2 and 93.5% for BS, WBB and weeds, respectively. The accuracies of DF_HSI model in comparison with the DF_ALL model was same for BS and slightly lower for WBB and weeds. However, it required smaller COM sets than the DF_ALL model with almost equivalent accuracy. All individual COM set models (DF_L, DF_H, DF_S and DF_I) were capable of less than 90% overall accuracy. Two GLCM models (DF_L and DF_I) showed poor accuracies (<80%) of WBB. DF_H and DF_S COM models showed a slight improvement over other COM set models but they were lower than 90%. The DF_H model showed 99.2% accuracy in detecting BS and DF_S model showed 86.5% of BS accuracy. DF_H model could be used for fungicides for floral blights (monilinia and botrytis) and leaf diseases (septoria and rust) on foliage only, due to the 99% accuracy of BS identification at a lower computational cost than multi-COM models.

Comparison of the DF_HSI$_{SD}$ model to the DF_ALL and DF_HSI models shows that it performed almost equivalent to both models in terms of BS detection. DF_HSI$_{SD}$ model showed 99.1, 96.1 and 86.9% of accuracies for BS, WBB and weeds, respectively. Nine BS misclassifications were categorized as weeds. Eighty seven WBB misclassifications were categorized as weeds. Thirty three of one hundred twelve misclassified weeds were categorized as BS and the remaining seventy nine as WBB (Table 5). Cross misclassification between WBB and weeds caused their low accuracies compared to the DF_ALL and DF_HSI models. However, it can be stated that the DF_HSI$_{SD}$ model is favourable compared to the DF_ALL and DF_HSI models in terms of using less COM sets (DF_H, DF_S and DF_I), or lesser number of features which will contribute to the reduction of processing time.

TABLE 5

Classification result of the DF_HSI$_{SD}$ model.

| Category | Number of observations classified into category | | | Accuracy (%) |
|---|---|---|---|---|
| | BS | WBB | weeds | |
| BS | 999 | 0 | 9 | 99.1 |
| WBB | 0 | 2121 | 87 | 96.1 |
| weeds | 33 | 79 | 744 | 86.9 |

The overall accuracies of three two-COM set models with reduction models (DF_HS$_{SD}$, DF_HI$_{SD}$ and DF_SI$_{SD}$) ranged from 91 to 92%. The DF_SI$_{SD}$ model showed 97.7, 93.1 and 86.0% of accuracies for BS, WBB and weeds, respectively. Twenty three BS misclassifications were categorized as weeds. One hundred fifty three WBB misclassifications were categorized as weeds. Sixty four of one hundred twenty misclassified weeds were categorized as BS and the remaining fifty six as WBB (Table 6). Coupled to the fact that DF_SI$_{SD}$ has reduced the burden of arccosine calculation coming from hue conversion, its higher overall accuracy makes it the appropriate model.

TABLE 6

Classification result of the DF_SI$_{SD}$ model.

| Category | Number of observations classified into category | | | Accuracy (%) |
|---|---|---|---|---|
| | BS | WBB | weeds | |
| BS | 985 | 0 | 23 | 97.7 |
| WBB | 0 | 2055 | 153 | 93.1 |
| weeds | 64 | 56 | 736 | 86.0 |

The HSI$_{LD}$ model showed 95.3, 92.1 and 85.0% of accuracies for BS, WBB and weeds, respectively. Using this technique for classification, forty seven BS misclassifications were categorized as weeds. Seven of one hundred seventy five misclassified WBB were categorized as BS and the remaining one hundred sixty eight as weeds. Sixty five of the one hundred twenty eight misclassified weeds were categorized as BS and the remaining sixty three as WBB (Table 7). The use of the HSI$_{LD}$ enabled the use of only four features that will result in a modest saving in processing time, compared to the DF_HSI model.

TABLE 7

Classification result of the HSI$_{LD}$ model.

| Category | Number of observations classified into category | | | Accuracy (%) |
|---|---|---|---|---|
| | BS | WBB | Weeds | |
| BS | 961 | 0 | 47 | 95.3 |
| WBB | 7 | 2033 | 168 | 92.1 |
| weeds | 65 | 63 | 728 | 85.0 |

Case Study of Misclassification

Five different cases of misclassification were found from DF_HSI$_{LD}$, DF_SI$_{SD}$ and HSI$_{LD}$ models. i) All misclassification of BS was recognized as weeds. Small stones or tire tracks were found from misclassified BS images. All misclassification of WBB as BS was observed dark shade only in HSI$_{LD}$ model. Reddish and/or less foliaged WBB under shade was observed in the most cases of misclassification of WBB as weeds. iv) Brown-coloured weeds and/or less foliaged weeds under shade were observed in misclassification of weeds as BS. v) Mixed WBB and weeds was observed in misclassification of weeds as WBB. Variable shade from no shade to little shade was observed in misclassification case.

Greenness detection during image pre-processing would be helpful to solve cases (i), (ii) and (iv). Wide dynamic range camera would be the most powerful tools to solve cases (ii), (iii) and (iv) cause by shadows. However, the price of wide dynamic range camera is too high for a cost-effective commercial solution. Multiple dynamic ranges that can use different ratio of brightness/exposure time would be the solution for shadows. High resolution camera would be the solution for the case (v). However, the portion of case (v) is less than 2%, for which accuracy can be traded off with processing time and high price. Independent light source induction in the system (e.g. from the front boom) might be another option to minimize the errors caused by shadow.

Real-Time Algorithms

With the consideration of computational load and accuracies, DF_SI$_{SD}$ and HSI$_{LD}$ model could be the most preferable models with overall accuracy of 92.7% and 91.4%, respectively. DF_HSI$_{SD}$ model could be another option which is showing better accuracy (94.9% overall accuracy) with more calculation load.

The steps of the DF algorithms (DF_SI$_{SD}$ and DF_HSI$_{LD}$) would be: (1) compute the respective features from the corresponding COM, (2) DF score on the discriminant function with selected features' values, constants and weights, (3) decide category by selecting biggest value out of three scores of discriminant functions.

The steps of HSI$_{LD}$ model included (1) derivation of H, S, and I images, (2) construction of associated COMs, (3) computation of the four features H2, S3, S1 and I3 from these COMs, (4) determining a sample's class BS/or 'others' using scatter plot (FIG. 4), (5) determining a sample's class as weed/or WBB using the next scatter plot.

These three algorithms provided real-time results: two based on discriminant analysis (the DF_HSI$_{SD}$ and DF_SI$_{SD}$), and the HSI$_{LD}$ method.

Three sets of algorithms were developed for the identification of BS, WBB and weeds, based on a COM-based textural classification. The first algorithm (DF_HSI$_{SD}$) using three COMs and selected textural features provided the best accuracy (94.9%) among the three algorithms. Second algorithm (DF_SI$_{SD}$) using two COMs and selected textural features provided 92.7% accuracy. The third algorithm (HSI$_{LD}$) based on two-step linear discrimination based on four HSI features (H2, S3, S1 and I3) exhibited 91.4% accuracy.

Any of these reduced textural feature algorithms can be employed. The choice of one algorithm over another will depend on whether processing speed or accuracy is more important for the end-user's application. For applications that require a greater emphasis on accuracy at a slightly longer processing time, the first algorithm would be the preferred choice; whereas the second and third algorithms would be preferred in applications that can tolerate slightly lower accuracy but require a higher processing speed.

The blueberry examples are used in the disclosure solely to illustrate one actual real-world implementation that has been successfully tested and validated. Persons of ordinary skill in the art will appreciate that the technologies described herein may be applied to a variety of other types of crops, including without limitation, other types of fruit or vegetables, etc. The novel image recognition algorithms disclosed herein may also be used for detecting and spraying weeds on lawns, golf courses, etc. This colour-recognition and/or texture recognition technology also has broad applicability for recognizing plant discoloration, grass conditions, soil conditions, etc. This technology may be used not just for spraying agrochemicals but also for seeding, watering, dispensing nutrients, tilling, pruning, ground-working or any other manoeuvre or application. In other words, these machine-vision algorithms may be used to control any agricultural equipment, machine, apparatus, system or device.

This invention has been described in terms of specific examples, embodiments, implementations and configurations which are intended to be exemplary only. Persons of ordinary skill in the art will appreciate that obvious variations, modifications and refinements will become apparent from the present disclosure and that these can be made without departing from the scope of the present invention. The scope of the exclusive right sought by the Applicant is therefore intended to be limited solely by the appended claims.

The invention claimed is:

1. A mobile variable rate sprayer system for applying an agrochemical, the system comprising:
    a vehicle for transporting the agrochemical;
    at least one digital camera mounted to the vehicle for capturing an image;
    a processor for processing the image to determine image features using only a subset of luminance, hue, saturation and intensity image features;
    at least one controller for receiving signals from the processor; and
    at least one variable rate sprayer mounted on the vehicle, wherein each spray nozzle of the sprayer is controlled by the controller based on the image features.

2. The system as claimed in claim 1 wherein the vehicle comprises a front boom for supporting a plurality of spaced-apart digital cameras and a rear boom for supporting a plurality of spaced-apart spray nozzles and wherein the controller is a multi-channel controller for controlling the plurality of spray nozzles.

3. The system as claimed in claim 1 wherein the processor is configured to use as the subset only textural features drawn from hue, saturation and intensity co-occurrence matrices.

4. The system as claimed in claim 1 wherein the processor is configured to use as the subset only textural features drawn from saturation and intensity co-occurrence matrices.

5. A method of variably applying an agrochemical, the method comprising:
    capturing an image;
    processing the image to determine image features by using only a subset of luminance, hue, saturation and intensity image features; and
    controlling a variable rate spray nozzle based on the image features to thereby deliver an appropriate amount of the agrochemical.

6. The method as claimed in claim 5 wherein processing the image comprises:
    pre-processing the image by converting the image into NTSC-standard luminance, hue, saturation and intensity images;
    dividing each image into sub-regions;
    composing co-occurrence matrices for each of the sub-regions; and
    normalizing matrices to extract the textural features.

7. The method as claimed in claim 6 wherein the subset comprises only textural features drawn from hue, saturation and intensity co-occurrence matrices.

8. The method as claimed in claim 6 wherein the subset comprises only textural features drawn from saturation and intensity co-occurrence matrices.

9. A non-transitory computer-readable medium comprising instructions in code which when executed by a processor of a computing device cause the computing device to:
    send a signal to digital camera to cause the digital camera to capture an image;
    receive image data from the digital camera;
    process the image to determine image features by using only a subset of luminance, hue, saturation and intensity image features; and
    control an agricultural device based on the image features.

10. The non-transitory computer-readable medium as claimed in claim 9 wherein the code is configured to process the image by:
    pre-processing the image by converting the image into NTSC-standard luminance, hue, saturation and intensity images;
    dividing each image into sub-regions;
    composing co-occurrence matrices for each of the sub-regions; and
    normalizing matrices to extract the textural features.

11. The non-transitory computer-readable medium as claimed in claim 10 wherein the subset comprises only textural features drawn from hue, saturation and intensity co-occurrence matrices.

12. The non-transitory computer-readable medium as claimed in claim 10 wherein the subset comprises only textural features drawn from saturation and intensity co-occurrence matrices.

13. The non-transitory computer-readable medium as claimed in claim 9 wherein controlling the agricultural device comprises controlling a variable rate spray nozzle based on the image features to thereby deliver an appropriate amount of the agrochemical.

14. A mobile variable rate sprayer system for applying an agrochemical, the system comprising:
    a vehicle for transporting the agrochemical;
    at least one digital camera mounted to the vehicle for capturing an image;
    a processor for processing the image into RGB components and to determine a G ratio by computing a ratio of G to the sum of R, G and B;
    at least one controller for receiving signals from the processor; and
    at least one variable rate sprayer mounted on the vehicle, wherein each spray nozzle of the sprayer is controlled by the controller based on the G ratio.

15. The system as claimed in claim 14 wherein the vehicle comprises a front boom for supporting a plurality of spaced-apart digital cameras and a rear boom for supporting a plurality of spaced-apart spray nozzles and wherein the controller is a multi-channel controller for controlling the plurality of spray nozzles.

16. A method of variably applying an agrochemical, the method comprising:
   capturing an image;
   processing the image into RGB components and to determine a G ratio by computing a ratio of G to the sum of R, G and B; and
   controlling a variable rate spray nozzle based on the G ratio to thereby deliver an appropriate amount of the agrochemical.

17. A non-transitory computer-readable medium comprising instructions in code which when executed by a processor of a computing device cause the computing device to:
   send a signal to digital camera to cause the digital camera to capture an image;
   receive image data from the digital camera;
   process the image data into RGB components and to determine a G ratio by computing a ratio of G to the sum of R, G and B;
   control an agricultural device based on the G ratio.

18. The non-transitory computer-readable medium as claimed in claim 17 wherein the code is configured to control a variable rate spray nozzle based on the G ratio to thereby deliver an appropriate amount of the agrochemical.

\* \* \* \* \*